United States Patent [19]

Danloup et al.

[11] Patent Number: 4,707,089
[45] Date of Patent: Nov. 17, 1987

[54] SPECTACLES FORMED OF A FRAME AND A SADDLE BRIDGE

[75] Inventors: André Danloup; Pierre Galzandat; Claude Hubin; Charles Storino, all of Saint Mihiel, France

[73] Assignee: Essilor International (Compagnie Generale d'Optique), Creteil, France

[21] Appl. No.: 740,007

[22] Filed: May 31, 1985

[30] Foreign Application Priority Data

Jun. 4, 1984 [FR] France ............................ 84 08720
Jul. 30, 1984 [FR] France ............................ 84 12056

[51] Int. Cl.⁴ ........................ G02C 5/12; G02C 1/00
[52] U.S. Cl. ................................. 351/138; 351/88
[58] Field of Search ................. 351/138, 87, 88, 78, 351/79, 80, 81, 82, 136, 137, 139

[56] References Cited

U.S. PATENT DOCUMENTS 4,405,214 9/1983 Bolle ................................ 351/138
4,470,674 9/1984 Piampiano ....................... 351/136

FOREIGN PATENT DOCUMENTS 3121877 12/1982 Fed. Rep. of Germany ........ 351/80
2472764 7/1981 France .............................. 351/136

Primary Examiner—Rodney B. Bovernick
Attorney, Agent, or Firm—Burgess, Ryan & Wayne

[57] ABSTRACT

Spectacle frame comprising two eyewires associated by at least one assembly bar, wherein each of the eyewires comprises in the nasal rest zone of the frame at least one projecting element adapted to be secured in the wall of a saddle bridge in order to maintain it hooked to the said spectacle frame, and having application to the rapid, reliable and aesthetic fixation of a saddle bridge to a spectacle frame.

6 Claims, 8 Drawing Figures

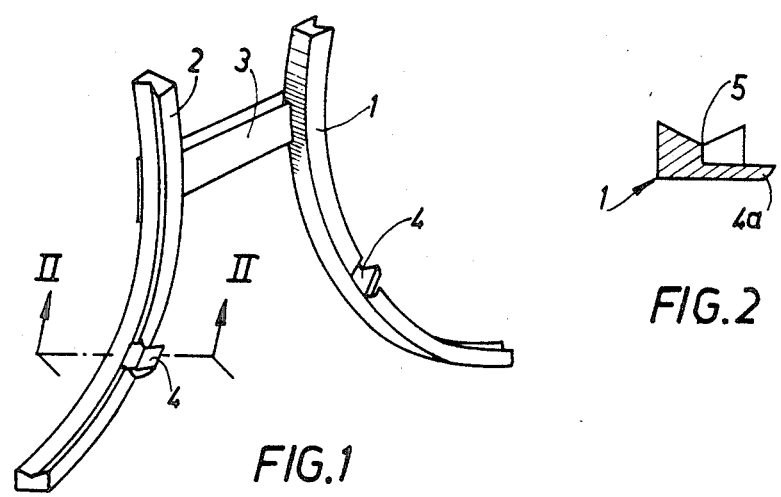
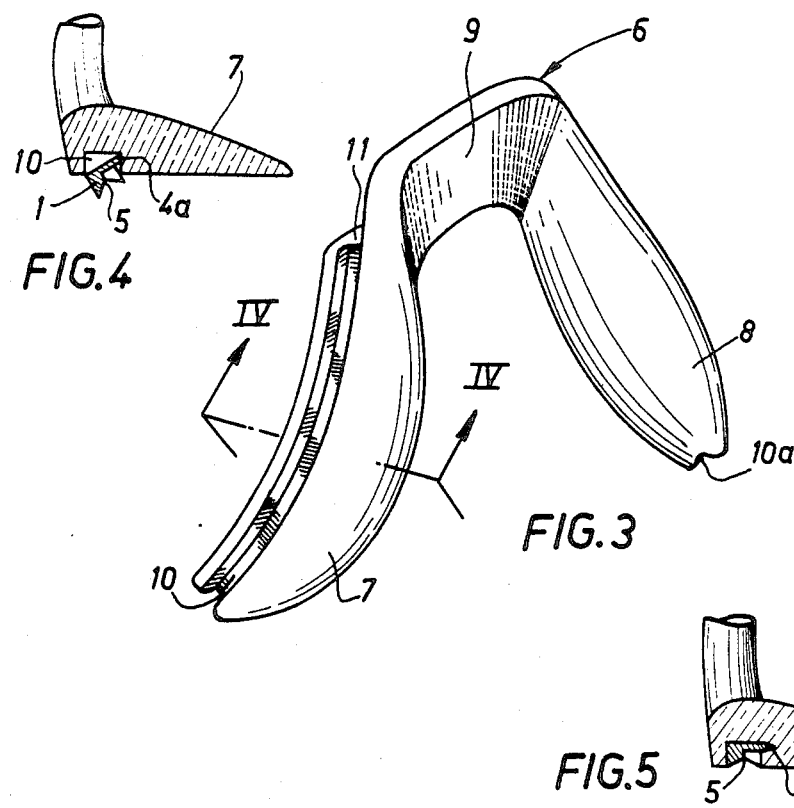

SPECTACLES FORMED OF A FRAME AND A SADDLE BRIDGE

BACKGROUND OF THE INVENTION

1. Field of the Invention

The present invention concerns a spectacle frame comprising two eyewires or rims associated by at least one assembly bar. It also concerns a saddle bridge formed from two alas connected by a bridge, each of the alas presenting at least one channel in which is intended to be inserted the nasal rest zone of the corresponding eyewire.

The present invention concerns, furthermore, spectacles of the type comprising a frame formed of two eyewires associated through at least one assembly bar and a saddle bridge formed of two alas connected by a bridge, each of the alass presenting at least one channel in which is intended to be inserted the nasal rest zone of the corresponding eyewire.

The saddle bridges are U-shaped pieces made of plastic material which are housed above the assembly bars of the frame and are intended to lay upon the sides of the nose of the spectacle wearer.

2. Description of the Prior Art

Saddle bridges are known which are hooked or ratched by a channel on eyewires and on an assembly bar of these eyewires through the inherent resilience of the plastic material which constitutes them. These saddle bridge frames of known type all present an unsatisfactory aesthetical appearance due to the fact that, in order to ensure the hooking to the saddle bridge on the eyewires and the assembly bar, it is necessary to foresee relatively great thicknesses of plastic material in order, on the one hand, to surround or cover the metallic outlines on which they are hooked and, on the other hand, to obtain sufficient reaction effort to secure the ratching.

Furthermore, the maintenance of the saddle bridge is not sufficiently guaranteed and it can accidently escape from the frame.

Saddle bridges are also known which are fixed by punching on lugs in the form of a point, the said lugs being repeated through welding onto eyewires in their nasal zone. This type of mounting requires special tools. Furthermore, the change of the saddle bridge is rendered difficult by the very resistent securing of the lugs in the saddle bridge material.

One of the aims of the present invention is specifically to achieve saddle bridge spectacles in which the saddle bridge can present lesser thicknesses of material and thus an improved aesthetic appearance, while giving rise to a resistent securing and being easy to reduce to practice in the spectacle eyewires without requiring any special tools. Furthermore, this securing occurs in a manner that is practically independent from the form and the position of the assembly bar(s) that connect(s) the eyewires and determine to a large extent the aesthetic appearance of the spectacles by also independently from the form of the section of the spectacle eyewires.

With this purpose, according to a first embodiment of the invention, each spectacle eyewire comprises in its nasal rest zone at least one projecting element adapted to be secured in the saddle bridge which is provided with two alas each presenting a channel intended to be inserted in the nasal rest zone of the corresponding eyewire, the projecting elements being secured in one of the lateral walls of the corresponding channel of the saddle bridge.

According to a variant of this first advantageous embodiment of the invention, the projecting element is achieved by local crushing or punching towards the outside of a portion of the metallic section of the eyewire.

According to the fist embodiment of the invention, it is necessary, in order to ensure correctly hooking the projecting elements in the lateral wall of the saddle bridge, that this projecting element have a transversal section in the form of a point adapted to penetrate the relatively soft material of the saddle bridge.

One of the aims of the second embodiment according to the present invention is specifically to prevent that it be necessary that the projecting element have a form that is too pointed and thus liable to deeply bruise or damage the material of the saddle bridge and to allow an even easier mounting of the saddle bridge upon the spectacle eyewires.

With the purpose, according to this second embodiment of the invention, the lateral wall of the channel in which is secured the projecting element presents, at least on the zone cooperating with this projecting element, a front in relief or undercut adapted to increase the hooking effect of the projecting element on the saddle bridge. The undercut front of the lateral wall thus constitutes supplementary stop means for the projecting element that no longer requires to be deeply engaged in this wall and which can even flexibly bear upon this wall in order to suppress all mounting clearance between the channel of the saddle bridge and the spectacle eyewire.

In order to reduce the application effort to be exerted in order to introduce the eyewire into the channel of the saddle bridge, the lateral wall of the channel presents the undercut face solely upon the zone that is substantially limited and centered upon the projecting element, or again on a zone centered on the projecting element and having substantially the same width as the projecting element.

According to another variant of this second embodiment of the invention, in the saddle bridge intended to be utilized in association with the spectacle frame and comprising a bridge connecting two alas each provided with at least one channel in which is adapted to be inserted the nasal rest zone of the corresponding spectacle eyewire, at least one of the lateral walls of the channel can present an undercut front adapted to increase the hooking effect of a projecting element of the eyewire.

BRIEF DESCRIPTION OF THE DRAWINGS

Other aims advantages and features of the invention will become more apparent from reading the following description of two embodiments, given by way of non-limitative illustration and with reference to the appended drawings in which:

FIG. 1 represents a partial view in perspective with torn away sections of the nasal portion of the spectacle frame according to the first embodiment of the invention;

FIG. 2 is a section of one of the eyewires according to the line II—II of FIG. 1;

FIG. 3 is a view in perspective of the saddle bridge according to the first embodiment of the invention;

FIG. 4 is a cross section view of the saddle bridge according to the plane IV—IV of FIG. 3 at the moment that is placed on the eyewire, seen in cross section according to line II—II;

FIG. 5 is the same view in cross section as FIG. 4 but when the eyewire is completely inserted within the corresponding channel of the saddle bridge;

DETAILED DESCRIPTION OF THE DRAWINGS

Figure 6:
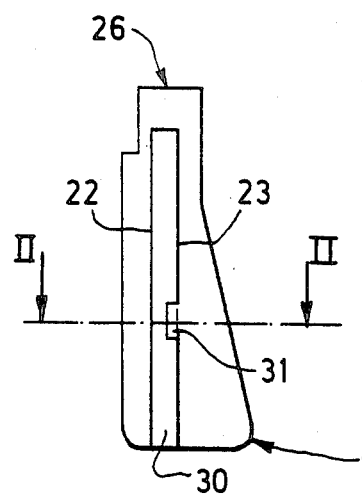
FIG. 6 is a side view on the normal scale of the saddle bridge according to the second embodiment of the invention.

On the part of the spectacle frame shown in FIG. 1, are represented two eyewires 1 and 2 connected by an assembly bar 3 in the nasal rest zone. According to the invention, each of the eyewires comprises laterally at least one projecting element 4 in the form of a point or tip the detail of which is represented in cross section in FIG. 2. The section of the eyewires 1 or 2 presents a V-shaped internal channel that forms the groove for maintaining the spectacle lenses and the projection 4 is formed by the local crushing towards the outside of the metal of the section of eyewire 1 or 2 located above one of the V-shaped sides. This local crushing also causes to appear a projecting point 4a on the lateral front of the eyewire, without reducing too greatly the section of the eyewire. This projecting point 4a can have the form of a rod which is generally oriented according to an axis perpendicular to the general plane of the eyewires passing by groove 5 and which are found either on the internal face of the frame, i.e. the face opposite the spectacle wearer, which allows improved concealment of the hooking, or on the opposite face which, in certain cases, facilitates hooking. FIG. 3 shows the saddle bridge 6 intended to be fixed on the spectacle frame in the nasal rest zone represented on FIG. 1. This saddle bridge, preferably made of a relatively soft material, such as plastic, presents in a conventional manner two alas or wings 7 and 8 associated by a transversal bridge 9. Each of alas 7 and 8 presents, on the external side, i.e. opposite the nose of the spectacle wearer, a longitudinal groove 10 (10a for side 8) in which is intended to be inserted practically without clearance a corresponding portion of eyewire 2 or 1 constituted by the nasal portion bearing the projecting element 4.

FIGS. 4 and 5 show how it is possible to carry out insertion of the nasal portion of the eyewire in channel 10 in order to assemble the saddle bridge to the spectacle frame. At the beginning of insertion, the section of the eyewire is presented slightly slantwise in channel 10 so that projecting point 4 is set against the internal ridge substantially at a right angle to channel 10. By pushing the section of the eyewire inside channel 10, projecting point 4a is made to penetrate the softer material constituting the saddle bridge or at least the envelope of the channel 10 and the nasal portion of the eyewire is thus secured in the lateral wall of channel 10, thus ensuring a resistent and aesthetic assembly between the eyewire and the side of the saddle bridge.

It will be noted that in order to achieve the assembly that has been described herein-above, it is necessary that the projecting element be more resilient than the material of the wall of channel 10. This effect can be obtained in numerous ways known to the man skilled in the art among which can be cited: hardening by cold-drawing the metal point for the eyewires and the plastic material for the saddle bridge. In order to improve the contact between saddle bridge 6 and the nasal zone of the frame without rendering more complicated the hooking operation, face 11 of the saddle bridge that is opposite assembly bar 3 can rest without embedding on this assembly bar 3.

Figure 8:
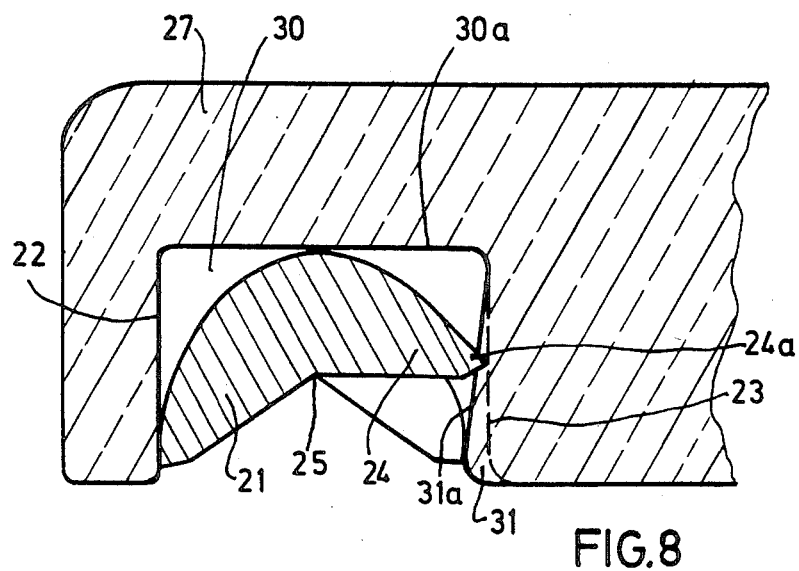
FIG. 8 represents, on a larger scale and in cross section with torn away sections of the same orientation as that of FIG. 7, the nasal part of the spectacle frame according to the second embodiment of the invention constituted by the saddle bridge in the channel of which is engaged an eyewire.

On saddle bridge 26 represented in a side view on FIG. 6, will be seen a lateral longitudinal channel 30 in which is intended to be inserted practically without clearance a corresponding part of eyewire 21 constituted by the nasal portion of this eyewire bearing a projecting element 24 obtained, for example, by local crushing or punching towards the outside of a portion of the metallic section of the eyewire 21 (cf. FIG. 8).

Figure 7:
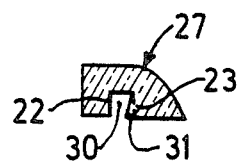
FIG. 7 is a cross section of one of the alas of the saddle bridge according to line II—II of FIG. 6.

One of the lateral walls 23 of channel 30, in the circumstances wall 23 in which is secured projecting element 24, presents part 31 of smaller width oriented in undercut as can be seen from FIG. 7 which represents the cross section of the side or temple 27 of the saddle bridge 26.

On the cross section on a larger scale of FIG. 8 can be seen side 27 of the saddle bridge in channel 30 of which is engaged eyewire 21 which presents a V-shaped internal groove 25 that is very open forming the groove for maintaining the spectacle lenses.

Projecting element 24 which presents a small projection beyond the projection of the eyewire or again a rounded end, is engaged above the part in undercut 31 which confirms the maintenance in position of eyewire 21 in hollow channel 30.

In order to achieve insertion of the nasal portion 21 of the eyewire in the channel 30, the same procedure as described above is adopted by presenting the section of eyewire 21 slightly slantwise in channel 30 so that the most projecting portion 24a of the projecting element is housed just below the portion in undercut 31 at the bottom of channel 30. In order to complete the placing in position of eyewire 21 in channel 30, it is thus sufficient to push the section of eyewire 21 in this channel 30. As will be seen in FIG. 8, only the projecting portion 24a of small height penetrates or rests upon the lateral face 31a inclined in undercut of portion 31 that thus confines eyewire 21 in channel 30.

By comparison with the means described in the first embodiment, the efforts to be exerted on eyewire 21 in order to ensure its insertion in the channel 30 are smaller. The projecting element 24 not being in fact intended to really penetrate the slightly inclined wall 21a, saddle bridge 26 can be made of a harder material and even the saddle bridge can be made of a material practically as hard as that of the eyewire 21. It will also be noted that face 31a inclined in undercut tends to repell eyewire 21 towards the bottom 30a of channel 30, thereby suppressing the local assembly play between the eyewire 21 and the wall of bottom 30a of channel 30. In order to ensure an improved assembly and correct wearing against channel 30 and the eyewire 21, several portions 31 in undercut can be distributed on lateral walls 22 and 23 of the channel. Furthermore, face 31a in undercut can extend simply adjacent to the issue of the lateral wall 23 towards the outside and leave free of draft the portion of the lateral face 23 located in the vicinity of the bottom of channel 30a.

It is well understood that the present invention is in no way limited to the embodiments represented and described herein-above and it can be adapted to numerous variants available to the man skilled in the art without departing from the scope and spirit of the said invention.

We claim:

1. A spectacle frame comprising:
   two eyewires substantially located in a plane;
   at least one assembly bar connected with the two eyewires;
   each eyewire including at least one projecting element, each projecting element being oriented in a direction substantially perpendicular to said plane;
   a saddle bridge including two alae;
   each alae including a channel intended to be inserted in a nasal rest zone of a corresponding eyewire, each channel having a widthwise dimension slightly smaller than the widthwise dimensions of said projecting elements; and
   each projecting element being secured in a lateral wall of a corresponding channel of the saddle bridge so as to secure the saddle bridge with the two eyewires.

2. Spectacle frame according to claim 1, wherein the projecting element is achieved through local crushing or punching towards the outside of a portion of a metallic section of the eyewire.

3. Spectacle frame according to claim 1, wherein the lateral wall of the channel in which is secured the projecting element presents, at least in a zone cooperating with this projecting element, an undercut face adapted to increase a hooking effect of the projecting element on the saddle bridge.

4. Spectacle frame according to claim 3, wherein the lateral wall of the channel presents the undercut face solely on the zone limited and substantially centered on the projecting element.

5. Spectacle frame according to claim 3, wherein the lateral wall of the channel presents the counter-clearance face solely on the zone centered on the projecting element and having substantially the same width as the projecting element.

6. Saddle bridge intended to be utilized in association with the spectacle frame according to any one of claims 2, 3, 4, 5 or 1, wherein each alae is formed at least in the vicinity of the channel, of a material having a hardness which is less than that of the projecting elements, so that the projecting elements can be secured in the wall of the channel.

* * * * *